United States Patent
Carter

(10) Patent No.: US 6,880,087 B1
(45) Date of Patent: Apr. 12, 2005

(54) BINARY STATE MACHINE SYSTEM AND METHOD FOR REGEX PROCESSING OF A DATA STREAM IN AN INTRUSION DETECTION SYSTEM

(75) Inventor: Earl T. Carter, Manchaca, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/415,293

(22) Filed: Oct. 8, 1999

(51) Int. Cl.$^7$ .................. H04L 9/100; G06F 11/30; G06F 7/02

(52) U.S. Cl. .................. 713/201; 713/164; 713/188; 714/39; 714/819

(58) Field of Search .................. 713/164, 188, 713/201, 200; 714/39, 819; 382/181, 182

(56) References Cited

U.S. PATENT DOCUMENTS

| | | | |
|---|---|---|---|
| 5,032,979 A | | 7/1991 | Hecht et al. .................. 364/200 |
| 5,101,402 A | | 3/1992 | Chiu et al. .................. 370/17 |
| 5,278,901 A | | 1/1994 | Shieh et al. .................. 380/4 |
| 5,319,776 A | * | 6/1994 | Hile et al. .................. 713/200 |
| 5,375,248 A | * | 12/1994 | Lemay et al. .................. 713/600 |
| 5,414,833 A | | 5/1995 | Hershey et al. .................. 395/575 |
| 5,448,724 A | | 9/1995 | Hayashi .................. 395/182.02 |
| 5,452,442 A | * | 9/1995 | Kephart .................. 714/38 |
| 5,488,715 A | | 1/1996 | Wainwright .................. 395/182.02 |
| 5,488,719 A | * | 1/1996 | Kaplan et al. .................. 707/100 |
| 5,524,238 A | | 6/1996 | Miller et al. .................. 395/600 |
| 5,557,742 A | | 9/1996 | Smaha et al. .................. 395/186 |
| 5,586,266 A | * | 12/1996 | Hershey et al. .................. 702/182 |
| 5,606,668 A | | 2/1997 | Shwed .................. 395/200.11 |
| 5,621,889 A | | 4/1997 | Lermuzeaux et al. .................. 395/186 |
| 5,699,513 A | | 12/1997 | Feigen et al. .................. 395/187.01 |
| 5,793,763 A | | 8/1998 | Mayes et al. .................. 370/389 |
| 5,796,942 A | | 8/1998 | Esbensen .................. 395/187.01 |
| 5,798,706 A | | 8/1998 | Kraemer et al. .................. 340/825.07 |
| 5,805,801 A | | 9/1998 | Holloway et al. .................. 395/187.01 |
| 5,826,014 A | | 10/1998 | Coley et al. .................. 395/187.01 |
| 5,919,257 A | | 7/1999 | Trostle .................. 713/200 |
| 5,931,946 A | | 8/1999 | Terada et al. .................. 713/201 |
| 5,991,881 A | | 11/1999 | Conklin et al. .................. 713/201 |
| 6,078,924 A | * | 6/2000 | Ainsbury et al. .................. 707/101 |
| 6,205,551 B1 | * | 3/2001 | Grosse .................. 713/201 |

OTHER PUBLICATIONS

"Preliminary Report on Advanced Security Audit Trail Analysis on UNIX," N. Habra et al., pp. 1–34 (found at http://www.cs.purdue.edu/coast/archive/data/categ24.html), Sep. 1994.

"IDIOT–Users Guide," M. Crosbie, et al., pp. 1–63, (found at http://www.cs.purdue.edu/coast/archive/data/categ24.html), Sep. 1996.

"An Introduction to Intrusion Detection," A. Sundaram, pp. 1–10, (found at http://www.cs.purdue.edu/coast/archive/data/categ24.html), Apr. 1996.

"Use of A Taxonomy of Security Faults," T. Aslam, et al., pp. 1–10, (found at http://www.cs.purdue.edu/coast/archive/data/categ24.html), Sep. 1996.

(Continued)

Primary Examiner—Gilberto Barrón
Assistant Examiner—A. Nobahar
(74) Attorney, Agent, or Firm—Baker Botts L.L.P.

(57) ABSTRACT

A binary state machine system and method for REGEX processing of a data stream in an intrusion detection system are disclosed. The method comprises maintaining a state table. The state table is indexed such that inputs comprising a current state and a current character yield an output of a new state. The new state is related to an indication of an attack on a computer network. The method further includes maintaining the current state. An input stream comprising a plurality of characters is received. A first character of the input stream is selected as the current character. The current character and the current state are compared to the state table to generate a new state.

20 Claims, 3 Drawing Sheets

OTHER PUBLICATIONS

"Artificial Intelligence and Intrusion Detection: Current and Future Directions," Jeremy Frank, pp. 1–12, (found at http://www.cs.purdue.edu/coast/archive/data/categ24.html), Jun. 1994.

"ASAX Conceptual Overview," ASAX Brochure, A. Mounji, (found at http://www.cs.purdue.edu/coast/archive/data/categ24.html), 1992.

"GrIDS–A Graph Based Intrusion Detection System For Large Networks," S. Staniford–Chen, et al., 10 pages, (found at http://www.cs.purdue.edu/coast/archive/data/categ24.html), 1996.

"A Pattern Matching Model For Misuse Intrusion Detection," S. Kumar, et al., pp. 1–11, (found at http://www.cs.purdue.edu/coast/archive/data/categ24.html), Jun. 1994.

"An Application of Pattern Matching in Intrusion Detection", S. Kumar, et al., pp. 1–55, (found at http://www.cs.purdue.edu/coast/archive/data/categ24.html), Mar. 1994.

"A Software Architecture to Support Misuse Intrusion Detection", S. Kumar, et al., pp. 1–17, (found at http://www.cs.purdue.edu/coast/archive/data/categ24.html), 1995.

"Applying Genetic Programming to Intrusion Detection", M. Crosbie, et al., pp. 1–8, (found at http://www.cs.purdue.edu/coast/archive/data/categ24.html), Nov. 1995.

"Defending a Computer System Using Autonomous Agents", M. Crosbie, et al., pp. 1–11, (found at http://www.cs.purdue.edu/coast/archive/data/categ24.html), Mar. 1994.

"Analysis Of An Algorithm For Distributed Recognition And Accountability", C. Ko, et al., pp. 1–11, (found at http://www.cs.purdue.edu/coast/archive/data/categ24.html), 1993.

"A Standard Audit Trail Format", Matt Bishop, Proc. of the 1995 NISSC, Baltimore, MD., (found at http://www.seclab.cs.ucdavis.edu/papers.html), 1995.

Master Thesis entitled USTAT A Real–time Intrusion Detection System for UNIX, University of California, K. Ilgun, pp. 1–204, (found at http://www.cs.purdue.edu/coast/archive/data/categ24.html), Nov. 1992.

"A Weakness in the 4.2BSD Unix TCP/IP Software", R. Morris, 4 pages, (found at http://www.cs.purdue.edu/coast/archive/data/categ30.html), Feb. 1985.

"The Architecture and Implementation of Network–Layer Security Under Unix", J. Ioannidis, et al., 11 pages, (found at http://www.cs.purdue.edu/coast/archive/data/categ30.html), Oct. 1993.

"A Best–Case Network Performance Model", S.M. Bellovin, pp. 1–10, (found at http://www.cs.purdue.edu/coast/archive/data/categ30.html), Feb. 1992.

"OARnet Security Procedures", K. Varadhan, pp. 1–14, (found at http://www.cs.purdue.edu/coast/archive/data/categ30.html), Sep. 1992.

"Paving The Road To Network Security Or The Value Of Small Cobblestones", H. Orman, et al., pp. 1–17, (found at http://www.cs.purdue.edu/coast/archive/data/categ30.html), May 1994.

"Packets Found on an Internet", S. Bellovin, pp. 1–6, (found at http://www.cs.purdue.edu/coast/archive/data/categ30.html), Aug. 1993.

"Security Problems in the TCP/IP Protocol Suite", S.M. Bellovin, (reprinted from Computer Communication Review, vol. 19, No. 2, pp. 32–48) pp. 1–17, Apr. 1989.

"A Security Analysis of the NTP Protocol", Matt Bishop, pp. 1–20, (found at http://www.cs.purdue.edu/coast/archive/data/categ30.html), 1990.

"WAN–hacking with AutoHack–Auditing Security Behind the Firewall", Alec Muffett, 14 pages, (found at http://www.cs.purdue.edu/coast/archive/data/categ30.html), Jun. 1995.

"ACMAINT: An Account Creation and Maintenance System for Distributed UNIX Systems", D.A. Curry, et al., pp. 1–9, (found at http://www.cs.purdue.edu/coast/archive/data/categ30.html), Oct. 1990.

"NFS Tracing By Passive Network Monitoring", Matt Blaze, 11 pages, (found at http://www.cs.purdue.edu/coast/archive/data/categ30.html), 1992.

"Pseudo–Network Drivers and Virtual Networks", S.M. Bellovin, 15 pages, (found at http://www.cs.purdue.edu/coast/archive/data/categ30.html), Jan. 1990.

Masters Thesis entitled "Addressing Weaknesses In The Domain Name System Protocol", Purdue University, Christoph Schuba, pp. 1–87., (found at http://www.cs.purdue.edu/coast/archive/data/categ30.html), Aug. 1993.

"Countering Abuse of Name–Based Authentication", C.L. Schuba, et al., pp. 1–21., (found at http://www.cs.purdue.edu/coast/archive/data/categ30.html), Apr. 1994.

"The 'Session Tty' Manager", S.M. Bellovin, pp. 1–16, (found at http://www.cs.purdue.edu/coast/archive/data/categ30.html), Summer 1988.

"Secure RPC Authentication (SRA) for Telnet and FTP", D.R. Safford, et al., pp. 1–5 (found at http://www.cs.purdue.edu/coast/archive/data/categ30.html), 1993.

"A Reliable and Secure UNIX Connection Service", D. Draheim, et al., pp. 1–12, (found at http://www.cs.purdue.edu/coast/archive/data/categ30.html), 1987.

"TCP Wrapper Network Monitoring, Access Control, and Booby Traps", Wietse Venema, 8 pages., (found at http://www.cs.purdue.edu/coast/archive/data/categ30.html), 1992.

"Characteristics of Wide–Area TCP/IP Conversations", R. Cáceres, et al., pp. 1–12, (found at http://www.cs.purdue.edu/coast/archive/data/categ30.html), Sep. 1991.

"A Unix Network Protocol Security Study: Network Information Service", D.K. Hess, et al., 5 pages, (found at http://www.cs.purdue.edu/coast/archive/data/categ30.html), 1992.

"Insertion, Evasion, and Denial of Service: Eluding Network Intrusion Detection", T.H. Ptacek et al., pp. 1–63, Jan. 1998.

"A Method to Detect Intrusive Activity in a Networked Environment", L.T. Heberlein et al., Proc. of the 14th National Computer Security Conference, Oct. 1991, pp. 362–371., (found at http://seclab.cs.ucdavis.edu/papers.html), 1991.

"Internetwork Security Monitor: An Intrusion–Detection System for Large–Scale Networks", L.T. Heberlein et al., Proc. of the 15th National Computer Security Conference, Oct. 1992, pp. 262–271, 1992.

"Comparison Between Internet Security Scanner (ISS) 1.x and Internet Scanner 3.2", by Internet Security Systems., (found at http://www.iss.net), 1996.

"Automated Tools for Testing Computer System Vulnerability", W.T. Polk, 40 pages, Dec. 1992.

The Design of GrIDS: A Graph–Based Intrusion Detection Systems, S. Cheung et al., U.C. Davis Computer Science Department Technical Report SCE–99–2, 1999, pp. 1–47, (found at http://seclab.cs.ucdavis.edu/papers.html), Jan. 26, 1999.

"Luby–Rackoff Backwards: Increasing Security by Making Block Ciphers Non–Invertible", M. Bellare, et al., Advances in Cryptology–Eurocrypt 98 Proceedings, Lecture Notes in Computer Science, vol. 1403 Springer–Verlat (1998) pp. 1–27, (found at http://seclab.cs.ucdavis.edu/papers.html), Oct. 17, 1998.

"Detecting Disruptive Routers: A Distributed Network Monitoring Approach", K.A. Bradley, et al., Proceedings of the 1998 IEEE Symposium on Security and Privacy, Oakland, CA, pp. 115–124 (found at http://seclab.cs.ucdavis.edu/papers.html), May 1998.

"Stack and Queue Integrity on Hostile Platforms", P.T. Devanbu, et al., IEEE Symposium on Security and Privacy, Oakland CA, (found at http://seclab.cs.ucdavis.edu/papers.html), 1998.

"Techniques for Trusted Software Engineering", P.T. Devanbu et al., Proceedings of the 20th International Conference on Software Engineering, Kyoto, Japan, (found at http://seclab.cs.ucdavis.edu/papers.html), 1998.

"Data Level Inference Detection in Database Systems", R.W. Yip et al., Proceedings of the 11th IEEE Computer Security Foundations Workshop, Rockport, Massachusetts, (found at http://seclab.cs.ucdavis.edu/papers.html), 1998.

"The Design and Implementation of a Data Level Database Inference Detection System",. Yip et al., Proceedings of the Twelfth Annual IFIP WG 11.3 Working Conference on Database Security, Chalkidiki, Greece 14 pages, (found at http://seclab.cs.ucdavis.edu/papers.html), 1998.

"Theft of Information in the Take–Grant Protection Model", Matt Bishop, 35 pages, Journal of Computer Security 4(4):(1996), (found at http://seclab.cs.ucdavis.edu/papers.html), Mar. 13, 1997.

"Information Survivability, Security, and Fault Tolerance", Matt Bishop, position paper for the Information Survivability Workshop Journal of Computer Security #6) 1 pages, (found at http://seclab.cs.ucdavis.edu/papers.html), 1997.

"Teaching Computer Security", Matt Bishop, position paper for the Workshop on Education in Computer Security, Monterey CA, 3 pages, (found at http://seclab.cs.ucdavis.edu/papers.html), 1997.

"Protecting Routing Infrastructures from Denial of Service Using Cooperative Intrusion Detection", S. Cheung et al., Proc. new Security Paradigms Workshop, Cumbria, UK 13 pages, (found at http://seclab.cs.ucdavis.edu/papers.html), 1997.

"An Efficient Message Authentication Scheme for Link State Routing", S. Cheung, Proc. 13th annual Computer Security Applications Conference, San Diego, CA, 9 pages, (found at http://seclab.cs.ucdavis.edu/papers.html), 1997.

"Cryptographic Verification of Test Coverage Claims", P. Devanbu et al., Proceedings, Fifth ACM/SIGSOFT Conference on Foundations of Software Engineering Zurich, Switzerland) (found at http://seclab.cs.ucdavis.edu/papers.html), 1997.

"Property–Based Testing; A New Approach to Testing for Assurance", Fink et al., ACM SIGSOFT Software Engineering Notes, 22(4):, (found at http://seclab.cs.ucdavis.edu/papers.html), 1997.

"Checking for Race Conditions in File Accesses", Bishop et al., Computing Systems 9(2)., (found at http://seclab.cs.ucdavis.edu/papers.html), 1996.

"An Isolated Network for Research", Bishop et al., The 19th NISSC, pp. 1–9, (found at http://seclab.cs.ucdavis.edu/papers.html), 1996.

"Goal–Oriented Auditing and Logging", Bishop et al., submitted to IEEE Transactions on Computing Systems, (found at http://seclab.cs.ucdavis.edu/papers.html), 1996.

"Extending The Take–Grant Protection System", J. Frank et al., The IEEE Oakland Conference on Research in Security and Privacy., (found at http://seclab.cs.ucdavis.edu/papers.html), Dec. 5, 1996.

Network Security Via Reverse Engineering of TCP Code: Vulnerability Analysis and Proposed Solutions, Guha et al., Proc. of the IEEE Infocom '96 , San Francisco, CA (found at http://seclab.cs.ucdavis.edu/papers.html), 1996.

"Attack Class: Address Spoofing", Heberlein et al., The 19th National Information Systems Security Conference, (found at http://seclab.cs.ucdavis.edu/papers.html), 1996.

PhD. Theses entitled Execution Monitoring Of Security-Critical Programs In A Distributed System; A Specification--Based Approach, Calvin Cheuk Wang Ko, 111 pages, (found at http://seclab.cs.ucdavis.edu/papers.html), 1996.

"A Methodology for Testing Intrusion Detection Systems", Puketza et al., *IEEE Transactions on Software Engineering,* vol. 22, No. 10, (found at http://seclab.cs.ucdavis.edu/papers.html), 1996.

"The Exact Security of Digital Signatures–How to Sign with RSA and Rabin", Bellare et al. Earlier version appears in *Advances in Cryptology–Eurocrypt '96,* LNCS vol. 1070, U. Maurer ed., Springer–Verlag, pp. 399–416, (found at http://seclab.cs.ucdavis.edu/papers.html), 1996.

"How to Protect DES Against Exhaustive Key Search", Kilian et al., Advances in Cryptology—CRYPTO '96., (found at http://seclab.cs.ucdavis.edu/papers.html), 1996.

"GrIDS–A Graph Based Intrusion Detection System For Large Networks", Staniford–Chen et al., *The 19$^{th}$ NISSC.* 10 pages, (found at http://seclab.cs.ucdavis.edu/papers.html), 1996.

"NetKuang–A Multi–Host Configuration Vulnerability Checker", Zerkle et al., *Proc. of the 6th USENIX Security Symposium,* San Jose, CA., (found at http://seclab.cs.ucdavis.edu/papers.html), 1996.

Abstract entitled Theft of Information in the Take–Grant Protection Model, Matt Bishop, *Journal of Computer Security, vol. 3, No. 4,* (found at http://seclab.cs.ucdavis.edu/papers.html), 1995.

"Improving System Security via Proactive Password Checking", Matt Bishop, *Computers & Security,* vol. 14, No. 3, pp. 233–249, (found at http://seclab.cs.ucdavis.edu/papers.html), 1995.

"Simulating Concurrent Intrusions for Testing Intrusion Detection Systems: Parallelizing Intrustions", Chung et al., *Proc. of the 1995 NISSC,* Baltimore, MD, 11 pages, (found at http://seclab.cs.ucdavis.edu/papers.html), 1995.

"Network Security Monitor", L. Todd Heberlein, *Lawrence Livermore National Laboratory project deliverable,* (found at http://seclab.cs.ucdavis.edu/papers.html), 1995.

"Audit Log Analysis Using the Visual Audit Browser Toolkit", Hoagland et al., *U.C. Davis Computer Science Department Technical Report CSE–95–11,* (found at http://seclab.cs.ucdavis.edu/papers.html), 1995.

"MCF: A Malicious Code Filter", R.W. Lo et al., *Computers & Security,* (1995) vol. 14, No. 6. (27 pages.), (found at http://seclab.cs.ucdavis.edu/papers.html), 1995.

"Bucket Hashing and its Application to Fast Message Authentication", Phillip Rogaway, *Acvances in Cryptology—CRYPTO '95,* (found at http://seclab.cs.ucdavis.edu/papers.html), 1995.

"Provably Secure Session Key Distribution–The Three Party Case", Bellare et al., *Proc., of the 27th Annual ACM Symposium on Theory of Computing,* Las Vegas, NV, (found at http://seclab.cs.ucdavis.edu/papers.html), 1995.

"XOR MACs: New Methods for Message Authentication Using Finite Pseudorandom Functions", Bellare et al., *Advances in Cryptology—CRYPTO '95,* (found at http://seclab.cs.ucdavis.edu/papers.html), Oct. 1995.

"Holding Intruders Accountable on the Interent", Staniford-Chen et al., *Proc. of the 1995 IEEE Symposium on Security and Privacy,* Oakland, CA, (11 pages) (found at http://seclab.cs.ucdavis.edu/papers.html), 1995.

"LAFS: A Logging and Auditing File System", Christopher Wee, *Proc. of the 11th Computer Security Applications Conference,* 10 pages, (found at http://seclab.cs.ucdavis.edu/papers.html), 1995.

"Towards a Property–based Testing Environment with Applications to Security–Critical Software", Fink et al., *Proc. of the 4th irvine Software Symposium.* 10 pages, (found at http://seclab.cs.ucdavis.edu/papers.html),1994.

"Property–based Testing of Privileged Programs", Fink et al., *Proc. of the 10th Annual Computer Security Applications Conference,* Orlando, FL. 10 pages, (found at http://seclab.cs.ucdavis.edu/papers.html), Dec. 1994.

"Arificial Intelligence and Intrusion Detection: Current and Future Directions", Jeremy Frank, *Proc. of the 17th National Computer Security Conference.* 12 pages, (found at http://seclab.cs.ucdavis.edu/papers.html), 1994.

"Automated Detection of Vulnerabilities in Privileged Programs by Execution Monitoring", Ko et al., *Proc. of the 10th Annual Computer Security Applications Conference,* Orlando, FL. (found at http://seclab.cs.ucdavis.edu/papers.html), 1994.

"Common Techniques in Fault–Tolerance and Security", Levitt et al., *Proc. of the Dependable Computing for Critical Applications 4,* San Diego, CA. 4 pages, (found at http://seclab.cs.ucdavis.edu/papers.html), 1994.

"Network Intrustion Detection", Mukherjee et al., *IEEE Network,* May–Jun. 1994, vol. 8, No. 3, pp. 26–41. (found at http://seclab.cs.ucdavis.edu/papers.html), 1994.

"A New Suggestion for How to Encrypt with RSA", Bellare et al., *Eurocrypt '94,* 20 pages, (found at http://seclab.cs.ucdavis.edu/papers.html), 1994.

"The Security of Cipher Block Chaining", Bellare et al., *Advances in Cryptology—CRYPTO '94,* Santa Barbara CA. (19 pages.) (found at http://seclab.cs.ucdavis.edu/papers.html), 1994.

"Analysis Of An Algorithm For Distributed Recognition And Accountability", Ko et al., *Proc. 1st ACM Conference or Computer and Communication Security.* Fairfax, VA, Nov. 1993, 11 pages, (found at http://seclab.cs.ucdavis.edu/papers.html), 1993.

"Entity Authentication and Key Distribution". Bellare et al., *Advances in Cryptology—CRYPTO '93,* Santa Barbara, CA, Aug. 1993, pp. 232–249. (found at http://seclab.cs.ucdavis.edu/papers.html), Aug. 1993.

"Random Oracles are Practical: A Paradigm for Designing Efficient Protocols", Bellare et al., *Proc. of the 1st ACM Conference on Computer and Communication Security,* Fairfax, VA, Nov. 1993, pp. 1545–164. (found at http://seclab.cs.ucdavis.edu/papers.html), 1993.

"A Software–Optimized Encryption Algorithm", Rogaway et al., *Proc. of the Fast Software Encryption Cambridge Security Workshop,* Cambridge, UK (16 pages.) (found at http://seclab.cs.ucdavis.edu/papers.html), 1993.

"Anatomy of a Proactive Password Changer", Matt Bishop, *Proc. of the UNIX Security Symposium III* Baltimore, MD, 15 pages. (found at http://seclab.cs.ucdavis.edu/papers.html), 1992.

DIDS (Distributed Intrusion Detection System–Motivation, Architecture, and An Early Prototype, Snapp et al., *Proc. 14th National Computer Security Conference,* Washington, DC (9 pages.) (found at http://seclab.cs.ucdavis.edu/papers.html), 1991.

"Proactive Password Checking", Matt Bishop, *Proc. of the 7th International Conference on Information Security,* May 1991, pp. 169–181. (found at http://seclab.cs.ucdavis.edu/papers.html), 1991.

Dissertation entitled Issues in Debugging Sequential and Concurrent Programs: Methods, Techniques, and Implementation, University of California, Wingshun Wilson Ho, 191 pages. (found at http://seclab.cs.ucdavis.edu/papers.html), 1992.

Abstract entitled "Collaboration Using Roles" by M. Bishop, *Software—Practice and Experience,* vol. 20, No. 5, May 1990. (found at http://seclab.cs.ucdavis.edu/papers.html), May 1990.

Abstract entitled "An Extendable Password Checker" by M. Bishop, *Proc. UNIX Security II* Portland, OR, 27–28 Aug. 1990, pp. 15–16, (found at http://seclab.cs.ucdavis.edu/papers.html), 1990.

Abstract entitled "A Security Analysis of the NTP Protocol Version 2" by M. Bishop, Dec. 1990.

Abstract entitled "A Little Knowledge Goes a Long Way: Faster Detection of Compromised Data in 2–D Tables" by D. Gusfield, *Proc. of the 1990 IEEE Symposium on Research in Security and Privacy,* Oakland, CA, May 7–9, 1990, pp. 86–94, (found at http://seclab.cs.ucdavis.edu/papers.html), May 1990.

Abstract entitled "A Network Security Monitor" by L.T. Heberlein, G.V. Dias, K.N. Levitt, B. Mukherjee, and others *Proc. of the 1990 IEE Symposium on Research in Security and Privacy,* Oakland, CA, May 7–9, 1990, pp. 296–304, (found at http://seclab.cs.ucdavis.edu/papers.html), May 1990.

Abstract entitled "Static Analysis Virus Detection Tools for UNIX Systems" by P. Kerchen, et al., *Proc. 13th National Computer Security Conference,* Washington, DC, Oct. 1–4, 1990, pp. 350–365 (found at http://seclab.cs.ucdavis.edu/papers.html), Oct. 1990.

Abstract entitled "Security with Low Communication Overhead" by D. Beaver, et al., *Proc. Advances in Cryptology-CRYPTO '90,* Santa Barbara, CA Aug., 11–15, 1990, pp. 62–76, (found at http://seclab.cs.ucdavis.edu/papers.html), Aug. 1990.

Abstract entitled "The Round Complexity of Secure Protocols" by D. Beaver, et al., *Proc. of the 22nd Annual ACM Symposium on Theory of Computing,* Baltimore, MD, May 14–16, 1990, pp. 503–513. (found at http://seclab.cs.ucdavis.edu/papers.html), May 1990.

Abstract entitled "PACLs: An Access Control List Approach to Anti–Viral Security" by D.R. Wichers, et al., *Proc. 13th National Computer Security Conference,* Washington, DC, Oct. 1–4, 1990, pp. 340–349. (found at http://seclab.cs.ucdavis.edu/papers.html), Oct. 1990.

Abstract entitled "Verification of Secure Distributied Systems in Higher Order Logic: A Modular Approach Using Generic Components" by J. Alves–Foss, K. Levitt, *Proc. of the 1991 IEEE Computer Society Symposium on Research in Security and Privacy,* Oakland CA May 20–22, 1991, pp. 122–135. (found at http://seclab.cs.ucdavis.edu/papers.html), May 1991.

Abstract entitled "An Authentication Mechanism for USENET" by M. Bishop, *Proc. of the Winter 1991 USENIX Conference.* Jan. 21–25, 1991, pp. 281–287, (found at http://seclab.cs.ucdavis.edu/papers.html), Jan. 1991.

Abstract entitled "Password Management" by M. Bishop, *COMPCON Spring '91. Digest of Papers,* San Francisco, CA, Feb. 25–Mar. 1, 1991, pp. 167–169. (found at http://seclab.cs.ucdavis.edu/papers.html), Mar. 1991.

Abstract entitled "Teaching Computer Security" by M. Bishop, May 1993.

Abstract entitled "Recent Changes to Privacy Enhanced Electronic Mail" by M. Bishop, *Journal of Internetworking: Research and Experience.* vol. 4, No. 1, Mar. 1993, pp. 47–59. (found at http://seclab.cs.ucdavis.edu/papers.html), Mar. 1993.

Abstract entitled "A Modified Random Perturbation Method for Database Security" by P. Tendick, N. Matloff, *ACM Transactions on Database Systems,* Mar. 1994, vol. 19, No. 1, pp. 47–63, (found at http://seclab.cs.ucdavis.edu/papers.html), Mar. 1994.

Short presentation entitled "Intrusion Detection for Network Infrastructures" by S. Cheung, K.N. Levitt, C. Ko. *The 1995 IEEE Symposium on Security and Privacy,* Oakland CA, May 1995.

Master Thesis entitled "Paradigms for the Reduction of Audit Trails" by B. Wetmore, downloaded from http:seclab.cs.ucdavis.edu/papers.html, 1993.

"Open System Security—An Architectural Framework" by Arto T. Karila, (found at http://www/cs.purdue.edu/coast/archive/data/categ.30.html), Jun. 1991.

Product description for "Oil Change" located on the internet at http://store.mcaffe.com/product.asp?ProductID=28&CategoryID–12, pp. 1–2.

NetRanger 1.3 User's Guide, Copyright © 1997 by WheelGroup Corporation, NetRanger product first available summer of 1996.

"Information Security and Privacy in Network Environments," by U.S. Office of Technology Assessment, OTA–TCT–606 (Washington DC: US Government Printing Office), Sep. 1994.

"A Few Attacks on the Zero Knowledge State in Novell's Netware" by Greg Miller, pp. 1–11, (found at http://www.cs.purdue.edu/coast/archive/data/categ30.html), Jul. 30, 1996.

"Introduction to Algorithms," by Thomas H. Cormen, Charles E. Leiserson, Ronald L. Rivest, Chap. 34, pp. 853–885, Copyright # 1990.

* cited by examiner

BINARY STATE MACHINE SYSTEM AND METHOD FOR REGEX PROCESSING OF A DATA STREAM IN AN INTRUSION DETECTION SYSTEM

TECHNICAL FIELD OF THE INVENTION

The present invention relates in general to computer network intrusion detection systems and, more particularly, to a binary state machine system and method for REGEX processing of a data stream in an intrusion detection system.

BACKGROUND OF THE INVENTION

Security is a major concern among operators of computer networks. Attacks upon computer networks can disrupt the service of the computer network and can potentially expose proprietary data to such persons committing attacks.

Network security products such as intrusion detection systems (ID systems) can use a passive filtering technique to detect policy violations and/or patterns of misuse that indicate an attack is occurring or is imminent. The passive filtering technique usually comprises monitoring traffic upon or outside of the computer network for packets of data and comparing these packets of data with known "attack signatures."

Some conventional ID systems use a string matching algorithm as a passive filtering technique. A string-matching algorithm takes a string of characters from the input stream and compares the string of characters to known attack signatures. For example, some conventional ID systems can use a UNIX-based regular expression (REGEX) engine to search through an input stream for character strings that match an attack signature. In such a system, first the input stream is buffered. The buffer is compared to the REGEX command which searches through the entire buffer in order to find a match. If a match is found, indicating an attack, an alarm is sounded or preventative measures are taken.

There are several disadvantages with such a conventional ID system. For example, excessive memory and CPU resources are required during buffer manipulation. Furthermore, it may be necessary to examine individual characters in the data buffer several times in order to find a valid match. Furthermore, as data traffic increases such problems lead to the possibility of dropping packets, resulting in a potential failure to detect an attack.

An additional complicating factor is that for some attacks, there can be a large amount of irrelevant data between strings of relevant data. As a result, these conventional systems can require the buffering of large portions of the input stream, and it can be necessary to search portions of these buffered portions multiple times. Furthermore, it can be possible for an attack to cross a buffer boundary, leading to the possibility of missing the attack.

SUMMARY OF THE INVENTION

In accordance with the present invention, a binary state machine system and method are disclosed that provide significant advantages over prior developed string searching algorithms for intrusion detection systems.

According to one aspect of the present invention, a method for using a binary state machine for processing a data stream in an intrusion detection system comprises maintaining a state table. The state table is indexed such that inputs comprising a current state and a current character yield an output of a new state. The new state is related to an indication of an attack on a computer network. The method further includes maintaining a current state. An input stream comprising a plurality of characters is received. A first character of the input stream is selected as the current character. The current character and the current state are compared to the state table to generate a new state.

According to another aspect of the present invention, a system for use as a binary state machine for processing a data stream in an intrusion detection system comprises a state table. The state table is indexed such that inputs comprising a current state and a current character yield an output of a new state. The new state is related to an attack on a computer network. The system further comprises a state machine communicatively coupled to the state table. The state machine is operable to maintain the current state and receive an input stream comprising a plurality of characters. The state machine is further operable to select a first character of the input stream as the current character and compare the current character and the current state to the state table to generate a new state.

It is a technical advantage of the present invention that each character in the input stream need be examined only once. This advantage reduces the need for excessive buffering of data, and preserves CPU and memory resources of an ID system incorporating the invention.

It is another technical advantage that the present invention allows for more efficient searching of the input stream. This reduces the possibility of dropping packets, and increases the probability of detecting attacks.

It is a further technical advantage that it accounts for irrelevant data between strings of relevant data in an input stream without the need for excessive buffering of data. This eliminates the problem in conventional systems that occurs when an attack crosses the buffer boundary.

Other technical advantages should be apparent to one of ordinary skill in the art in view of the specification, claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
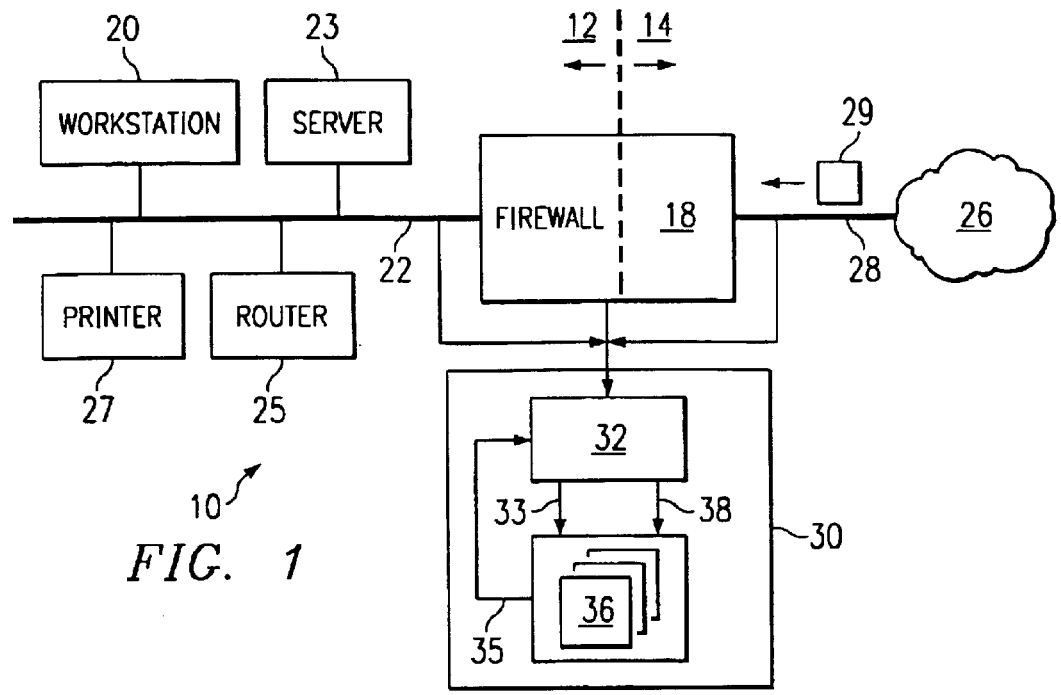
FIG. 1 is a block diagram of a computer network including an intrusion detection system having one embodiment of a state machine for processing data streams.

FIG. 1 is a block diagram of a computer network including an intrusion detection system having one embodiment of a state machine for processing data streams. A computer network, indicated generally at 10, includes a protected network 12 and an unprotected network 14. Protected network 12 is a "internal" network, meaning that only authorized users are permitted to pass data between systems coupled within protected network 12.

Protected network 12 includes several network devices coupled to a network medium 22. In the embodiment of FIG.

1, the network devices include a workstation 20, a server 23, a router 25, and a printer 27. Network 22 can include any network medium and protocol thereon, such as Ethernet. Firewall 18 couples to network medium 22 and separates protected network 12 from an unprotected network 14. Firewall 18 is intended to operate as a gate keeper, preventing unauthorized users on unprotected network 14 to interfere with the operation of protected network 12. Firewall 18 further allows authorized users on unprotected network 14 to access protected network 12. In the example of FIG. 1, unprotected network 14 includes network medium 28 coupled to the Internet 26.

An intrusion detection system 30 couples to network medium 22, network medium 28, or firewall 18. Intrusion detection system 30 may comprise, for example, software code executing on a computing platform separate from other network devices. Alternatively, intrusion detection system 30 can include functionality integrated within firewall 18 or some other network device on protected network 12.

Intrusion detection system 30 has access to network traffic on computer medium 28 and/or computer medium 22. As shown, intrusion detection system 30 can couple to network medium 28 on unprotected network 14. Alternatively, as further shown in FIG. 1, intrusion detection system 30 can couple to firewall 18, wherein firewall 18 passes network traffic to intrusion detection system.

Intrusion detection system 30 includes state machine 32 communicatively coupled to state tables 36. Intrusion detection system 30 and state machine 32 can comprise, for example, executable code stored on a computer readable medium and executable by a processor communicatively coupled to the computer readable medium. Alternatively, such components can be implemented in firmware or an ASIC implementation.

In operation, network traffic travels on network medium 28. The network traffic accessing firewall 18 and attempting to access firewall 18 form an input stream 29 to intrusion detection system 30. For example, input stream 29 may include data intended, for example, to one of the network devices within protected network 12. However, input stream 29 may also include some type of attack upon protected network 12.

Intrusion detection system 30 can recognize if input stream 29 includes an attack signature, meaning data within input stream 29 indicates an attack is occurring on protected network 12. Intrusion detection system detects the hostile nature of data within input stream 29 by practicing the present invention.

Intrusion detection system 30 accesses input stream 29 and communicates input stream 29 to state machine 32. State machine 32 maintains a current state 33. State machine 32 further selects a character 38 from input stream 29 as a current character. State machine 32 then compares current state 33 and current character 38 to state tables 36 to determine a new state 35.

State tables 36 are indexed such that inputs comprising the current state and a current character yield an output of a new state. State tables 36 are formed such that the new state can be related to an indication of an attack on a computer network, as explained with respect to later FIGUREs.

By using such an implementation, intrusion detection system 30 improves the efficiency of detection of attack signatures over conventional intrusion detection systems. For example, each character in the input stream is processed by intrusion detection system 30 only once. After the new state based upon that character and the current state is determined, there is no longer a need to buffer that character. As such, the implementation of FIG. 1 eliminates the drain upon processor and memory resources taken up by buffer manipulation.

Figure 2:
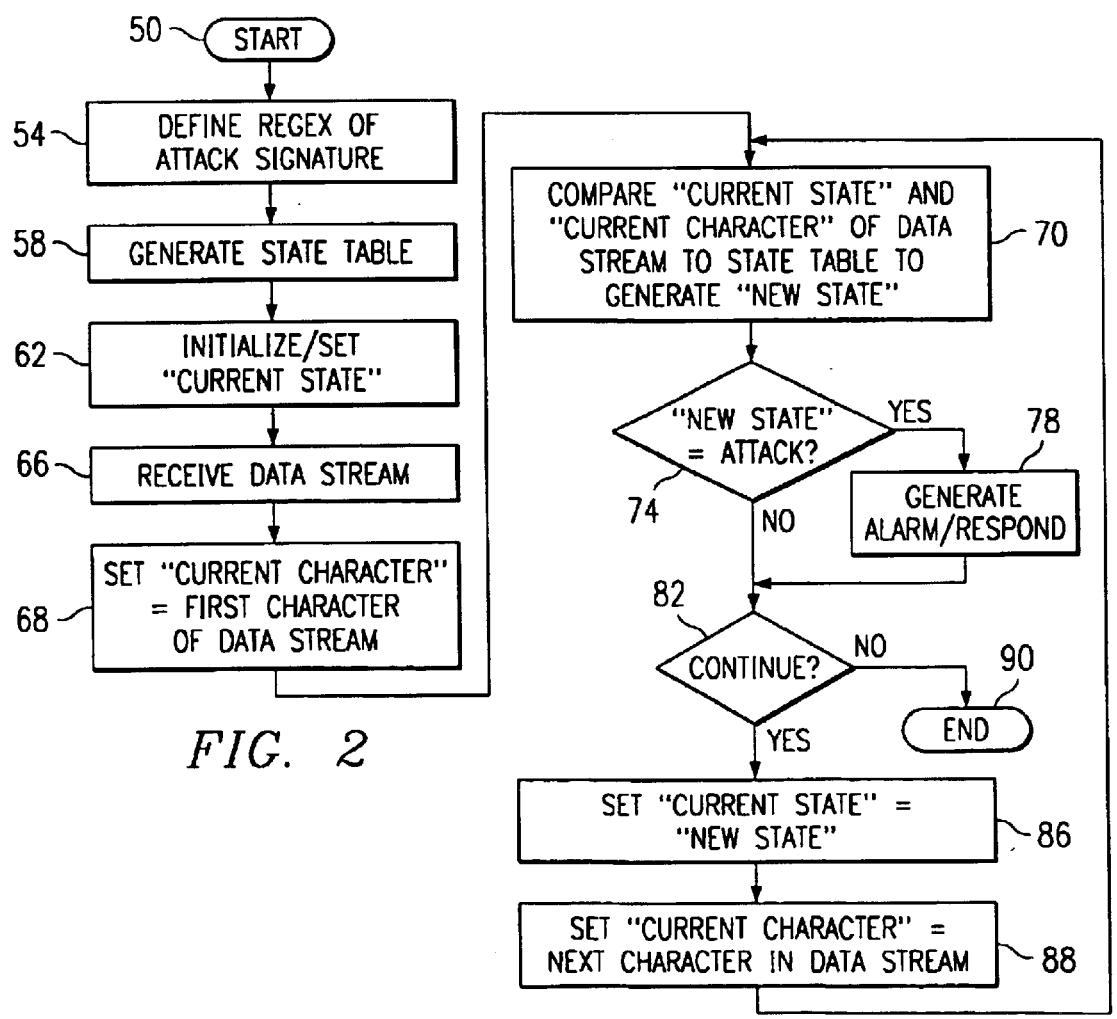
FIG. 2 is a flow diagram of one embodiment of a method for processing data streams using a binary state machine.

FIG. 2 is a flow diagram of one embodiment of a method for processing data streams using a binary state machine. The method starts at step 50. At step 54, a REGEX attack signature is defined. At step 58, a state table is created corresponding to that REGEX attack signature. The objective of step 58 is to create a state table indexed such that if a current state is known and a current character is known a new state can be generated. The REGEX command can include, for example, a character string or combination of character strings that indicate a particular attack is occurring upon a computer network. There are many such strings and many such attacks known in the art.

At step 62, the system is initialized and the "current state" is set. Such a step may be necessary, for example, before the input stream is detected. At step 66, the data stream is received. At step 68, the "current character" is selected as a character of the data stream received in step 66. For example, the first such character in the data stream can be selected as the first "current character."

At step 70, the "current state" and "current character" of the data stream are compared to the state table in order to generate a "new state." At step 74, the system checks to see if the "new state" is equal to a state indicating an attack is occurring. Most, if not all, attacks will have a signature comprising more than one character. Therefore, the state table, to detect such an attack, will include more than one state. If an attack is detected, at step 78 an alarm is generated or a response is created. For example, such an alarm may be an indication transmitted to an operator on the network. A response could include the implementation of a countermeasure—for example resetting a connection. If the new state does indicate an attack at step 74, the method continues to step 82.

At step 82, it is decided whether or not to continue the method. If not, the process ends at step 90. If the method continues, at step 86 the "current state" is set to equal the "new state." Then, at step 88, the "current character" is set to equal the next character in the data stream. The method then continues to step 70 to repeat the comparing step.

As can be seen in the method of FIG. 2, each character in the data stream is input into the state table along with the current state to create a new state. This new state is then used with the next character in the data stream to create another new state.

The method further shows how an intrusion detection system implementing such a system can attain many advantages. The need for extensive data buffering is eliminated, because each character need only be examined once, and compared to the state table once. Such a system implementing the method of FIG. 2 would improve efficiency as it would require fewer processing and memory resources. As such, an intrusion detection system employing the method of FIG. 2 will have fewer instances of dropped packets or missed signatures as compared to conventional intrusion detection systems.

Figures 3A, 3B:
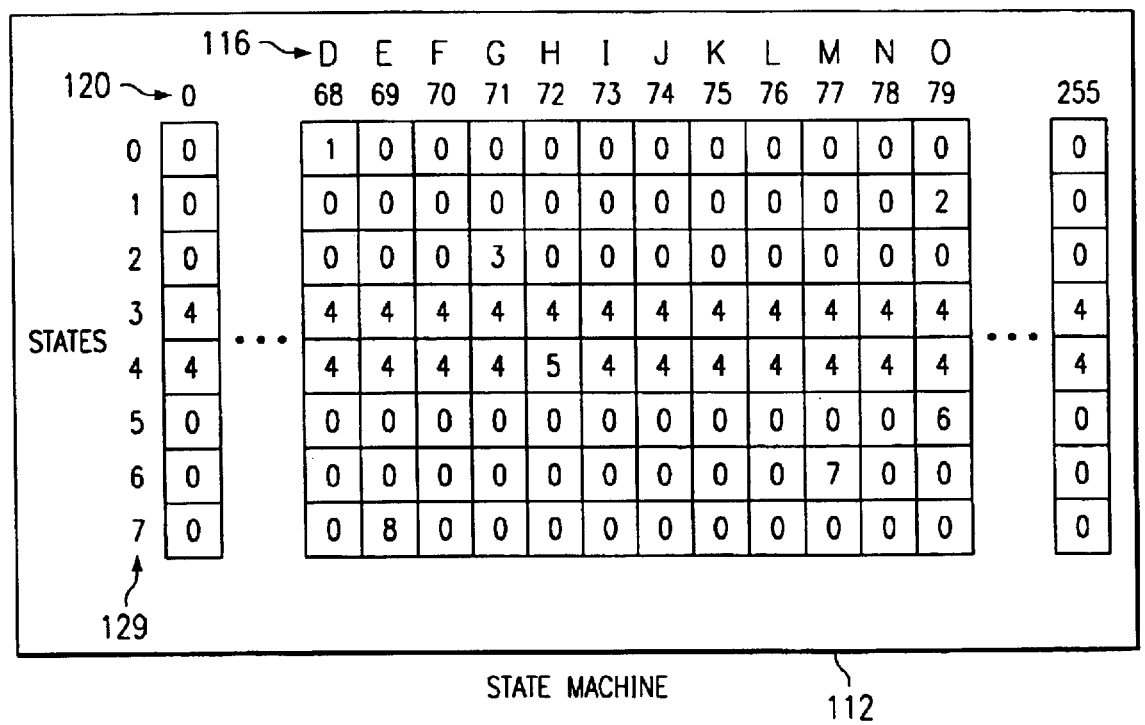
FIGS. 3A through 3C are block diagrams showing the operation of one embodiment of a binary state machine for an example data stream.
Figure 3C:
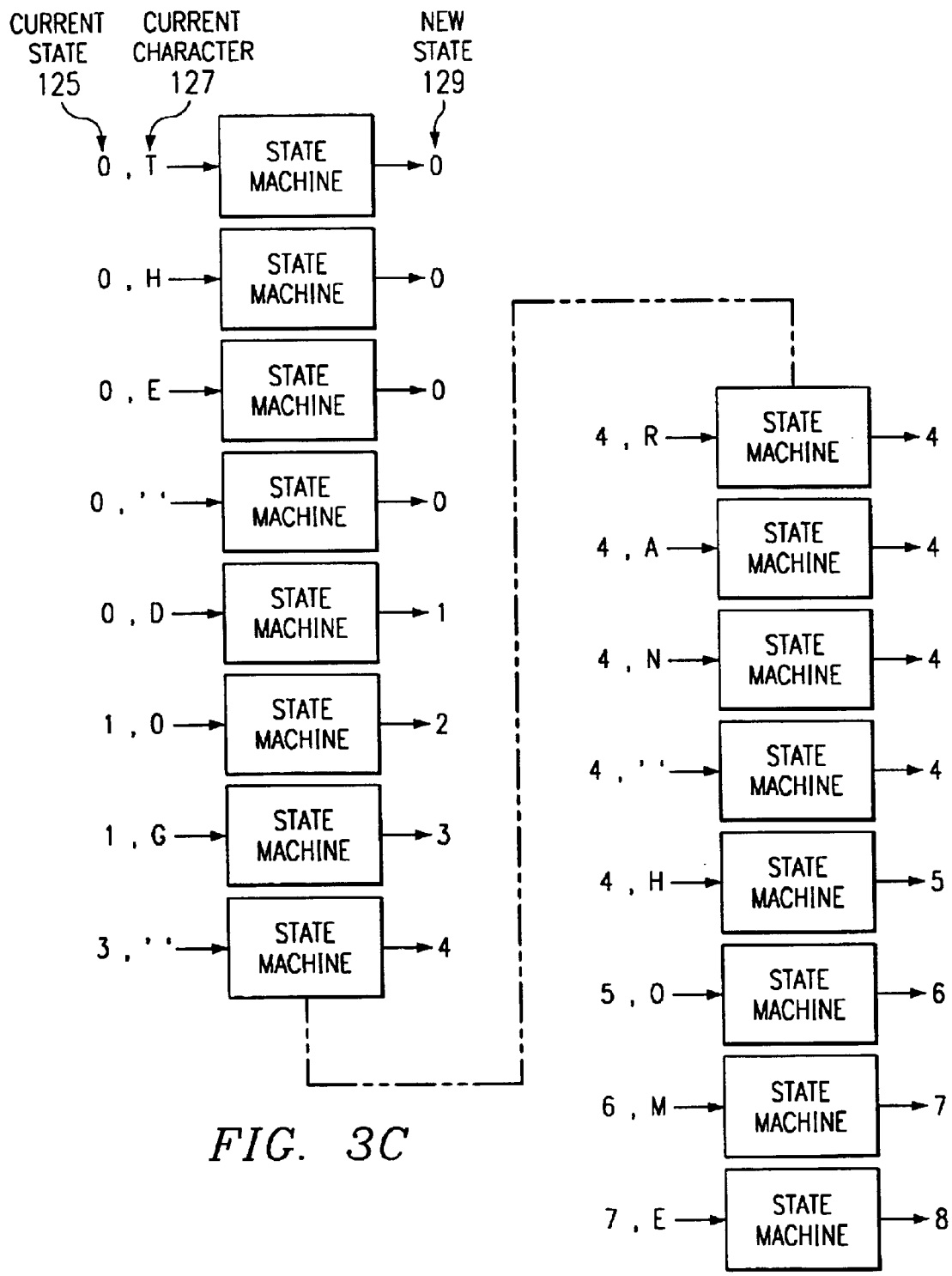

FIGS. 3A through 3C are block diagrams showing the operation of one embodiment of a binary state machine for an example data stream.

FIG. 3A shows an example of an input stream 100. In the example of FIG. 3A, input stream 100 includes the characters: "the dog ran home." FIG. 3A further shows the REGEX command 104 of an attack signature. In the example of FIG.

3A, the REGEX command is "dog.*home." This REGEX command indicates that an attack is indicated if: (1) the characters "d", "o", "g" are observed in order; (2) any number of characters occur after the "g"; and then (3) the characters "h", "o", "m", and "e" occur in order. As can be seen, with this attack signature, a properly executing intrusion detection system will recognize that input stream 100 indicates an attack is occurring on the computer network.

FIG. 3B shows one embodiment of a state table formed from the REGEX command 104 of FIG. 3A. State table 112 includes a state index 129 and a character index 120. State index 129 corresponds to the "current state" as referenced in the method of FIG. 2. Character index 120 corresponds to the "current character" as referenced in the method of FIG. 2. In the embodiment of FIG. 2, character index 120 comprises ASCII codes.

State table 112 is indexed such that inputs comprising a current state and a current character yield an output of a new state. The new state is related to an indication of an attack on a computer network. In the embodiment of FIG. 2, state number 8 is the state at which the "dog.*home" attack signature is detected.

In operation, given a current state 129 and a current character 120, table 112 generates a new state. For example, if the current state 129 is "1" and the current character 120 is "O", represented by ASCII code "79," the new state is "2." The state of "2" does not yet indicate an attack is occurring. Next, the current state 129 is set to "2" and the current character 120 is set to the next character in the data stream. As seen by state table 112, if the next character in the data stream is any character except for "G", the new state will be "0." This indicates that the attack this state table is designed to detect requires a "G" to immediately succeed an "O." On the other hand, if the next character after the "O" is a "G", it can be seen that state table 112 will generate a new state of "3."

FIG. 3C shows the operation of the state machine of the current invention using the input stream 100 of FIG. 3A, the REGEX command 104 of FIG. 3A, and the state table 112 of FIG. 3B. For example, in the first block, current state 125 is "0", and current character 127 "T", which is the first character in data stream 100. A new state 129 is generated by these inputs indexing state table 112. New state 129 with these inputs is "0". FIG. 3C shows the current state 125, current character 127, and new state 129 of each character of data stream 100 in FIG. 3A.

The present invention is described with respect to ASCII character sets. However, the present invention contemplates that an intrusion detection system implementing the method of the invention can be capable of interpreting character sets other than the ASCII character sets. Additionally, the present invention contemplates that many state tables can be integrated into a single intrusion detection system, such that many different attack signatures can be detected.

Although the present invention has been described in detail, it should be understood that various changes, substitutions and alterations can be made thereto without departing from the spirit and scope of the invention as defined by the appended claims.

What is claimed is:

1. A method for using a binary state machine for processing a data stream in an intrusion detection system, the method comprising:

maintaining a state table, the state table indexed such that inputs comprising a current state and a current character yield an output of a new state, the new state related to an indication of an attack on a computer network;

maintaining the current state;

receiving an input stream comprising a first plurality of characters, a second plurality of characters, and at least one variable character between the first plurality and the second plurality of characters, wherein the first plurality and the second plurality of characters together constitute a REGEX signature;

processing the first plurality of characters using the state table;

after processing the first plurality of characters, for each one of the at least one variable character;

selecting the variable character as the current character;

generating a state for the current character that is independent of the current character;

after generating the state, selecting a first character of the second plurality of characters as the current character; and after selecting the first character, comparing the current character and the current state to the state table to generate a new state.

2. The method of claim 1, further comprising initializing the current state to an initial state.

3. The method of claim 1, further comprising:

setting the current state equal to the new state;

selecting a next character of the second plurality of characters as the current character, the next character appearing subsequent to the first character; and repeating the comparing step.

4. The method of claim 1, further comprising recognizing the new state as indicative of an attack upon the computer network.

5. The method of claim 1, further comprising sounding an alarm.

6. The method of claim 1, further comprising generating the state table from a REGEX command.

7. A system for use as a binary state machine for processing a data stream in an intrusion detection system, the system comprising:

a state table indexed such that inputs comprising a current state and a current character yield an output of a new state, the new state related to an attack on a computer network; and a state machine communicatively coupled to the state table, the state machine operable to:

maintain the current state;

receive an input stream, the input stream comprising a first plurality of characters, a second plurality of characters, and at least one variable character between the first plurality and the second plurality of characters, wherein the first plurality and the second plurality of characters together constitute a REGEX signature process the first plurality of characters using the state table;

after processing the first plurality of characters, for each one of the at least one variable character:

select the variable character as the current character;

generate a state for the current character that is independent of the current character;

after generating the state, select a first character of the second plurality of characters as the current character; and after selecting the first character compare the current character and the current state to the state table to generate a new state.

8. The system of claim 7 further comprising a computer readable medium, wherein the state table is stored upon the computer readable medium.

9. The system of claim 8, wherein the state machine comprises software code stored upon the computer readable medium, the software code further operable to be executed by a computer processor.

10. The system of claim 7, wherein the state machine is further operable to initialize the current state to an initial state.

11. The system of claim 7, wherein the state machine is further operable to:
set the current state equal to the new state;
select a next character of the second plurality of characters as the current character, the next character appearing subsequent to the first character; and
repeat the comparing step.

12. The system of claim 7, wherein the state machine is further operable to recognizing the new state as indicative of an attack upon the computer network.

13. A system for use as an intrusion detection system, the system comprising:
a computer readable medium;
a network interface for receiving an input stream comprising a first plurality of characters, a second plurality of characters, and at least one variable character between the first plurality and the second plurality of characters, wherein the first plurality and the second plurality of characters together constitute a REGEX signature;
a processor communicatively coupled to the computer readable medium and the network interface;
a state table stored upon the computer readable medium, the state table indexed such that inputs comprising a current state and a current character yield an output of a new state, the new state related to an attack on a computer network; and
a state machine comprising instructions stored upon the computer readable medium and executable by the processor, the state machine communicatively coupled to the state table, the state machine operable to:
maintain the current state;
process the first plurality of characters using the state table;
after processing the first plurality of characters, for each one of the at least one variable character:
select the variable character as the current character;
generate a state for the current character that is independent of the current character;
after generating the state, select a first character of the second plurality of characters as the current character; and
after selecting the first character, compare the current character and the current state to the state table to generate a new state.

14. A logic for using a binary state machine for processing a data stream in an intrusion detection system, the logic embodied in a computer-readable medium and operable to:
maintain a state table, the state table indexed such that inputs comprising a current state and a current character yield an output of a new state, the new state related to an indication of an attack on a computer network;
maintain the current state;
receive an input stream comprising a first plurality of characters, a second plurality of characters, and at least one variable character between the first plurality and the second plurality of characters, wherein the first plurality and the second plurality of characters together constitute a REGEX signature
process the first plurality of characters using the state table;
after processing the first plurality of characters, for each one of the at least one variable character:
select the variable character as the current character;
generate a state for the current character that is independent of the current character;
after generating the state, select a first character of the second plurality of characters as the current character; and
after selecting the first character, compare the current character and the current state to the state table to generate a new state.

15. The logic of claim 14, further operable to initialize the current state to an initial state.

16. The logic of claim 14, further operable to:
set the current state equal to the new state;
select a next character of the second plurality of characters as the current character, the next character appearing subsequent to the first character; and
repeat the comparing step.

17. The logic of claim 14, further operable to recognize the new state as indicative of an attack upon the computer network.

18. The logic of claim 14, further operable to generate the state table from a REGEX command.

19. An intrusion detection system, comprising:
means for maintaining a state table, the state table indexed such that inputs comprising a current state and a current character yield an output of a new state, the new state related to an indication of an attack on a computer network;
means for maintaining the current state;
means for receiving an input stream comprising a first plurality of characters, a second plurality of characters, and at least one variable character between the first plurality and the second plurality of characters, wherein the first plurality and the second plurality of characters together constitute a REGEX signature;
means for processing the first plurality of characters using the state table;
means for selecting, after the first plurality of characters has been processed, each one of the at least one variable character as the current character and generating, for each selected variable character, a state for the current character that is independent of the current character;
means for selecting a first character of the second plurality of characters as the current character; and
means for comparing the current character and the current state to the state table to generate a new state; and
means for transmitting the copy of the input stream to the first network device if an attack on the computer network is not detected.

20. The method of claim 1, and further comprising:
setting the current state equal to the new state;
selecting a next character of the second plurality of characters as the current character, the next character appearing subsequent to the first character;
repeating the comparing step; and
wherein each character in the input stream is selected only once.

* * * * *